(12) United States Patent
Muta et al.

(10) Patent No.: US 11,455,804 B2
(45) Date of Patent: Sep. 27, 2022

(54) PEOPLE FLOW ANALYSIS APPARATUS, PEOPLE FLOW ANALYSIS METHOD, AND STORAGE MEDIUM

(71) Applicant: CANON KABUSHIKI KAISHA, Tokyo (JP)

(72) Inventors: Hajime Muta, Zama (JP); Kotaro Yano, Tokyo (JP); Yasuo Bamba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/828,818

(22) Filed: Mar. 24, 2020

(65) Prior Publication Data

US 2020/0320312 A1 Oct. 8, 2020

(30) Foreign Application Priority Data

Apr. 2, 2019 (JP) .............................. JP2019-070654

(51) Int. Cl.
*G06T 7/246* (2017.01)
*G06V 20/52* (2022.01)
*G06T 7/20* (2017.01)

(52) U.S. Cl.
CPC ................ *G06V 20/53* (2022.01); *G06T 7/20* (2013.01)

(58) Field of Classification Search
CPC ........... G06K 9/00711; G06K 9/00771; G06K 9/4604; G06K 9/00221; G06K 9/00778; G06K 9/00798; G06K 9/00228; G06K 9/00268; G06K 9/00899; G06K 9/2018; G06K 9/6256; G06K 9/6271; G06K 17/00; G06K 9/00234; G06K 9/00288; G06K 9/00302; G06K 9/00369; G06K 9/00442; G06K 9/00791; G06K 9/00805; G06K 9/00912; G06K 9/4652; G06K 9/6215; G06T 2207/20104; G06T 7/248; G06T 11/60

See application file for complete search history.

(56) References Cited

U.S. PATENT DOCUMENTS

| | | | | |
|---|---|---|---|---|
| 4,745,480 | A * | 5/1988 | Kinugasa | H04N 5/3742 348/302 |
| 2009/0222388 | A1* | 9/2009 | Hua | G06K 9/00778 706/12 |
| 2014/0071242 | A1* | 3/2014 | Lin | G06T 7/254 348/46 |
| 2016/0350615 | A1* | 12/2016 | Yano | G06K 9/209 |
| 2018/0089505 | A1* | 3/2018 | El-Khamy | G06T 7/11 |
| 2018/0253629 | A1* | 9/2018 | Bamba | G06V 10/457 |

FOREIGN PATENT DOCUMENTS

| | | | |
|---|---|---|---|
| JP | 2005-242646 A | 9/2005 | |
| JP | 2009-110152 A | 5/2009 | |
| JP | 2009110152 | * 10/2009 | |

* cited by examiner

*Primary Examiner* — Quan M Hua
(74) *Attorney, Agent, or Firm* — Canon U.S.A., Inc. IP Division

(57) ABSTRACT

An image processing apparatus includes a measurement area setting unit that sets a measurement area in an input image, a small image setting unit that sets a small image in the input image based on the measurement area, a first estimation unit that estimates a flow distribution of a target in the small image, and a second estimation unit that estimates the number of targets to pass through the measurement area based on the flow distribution in the small image.

17 Claims, 11 Drawing Sheets

FRAME M   FRAME (M + 1)

FRAME M   FRAME (M + 1)

FIG.9D
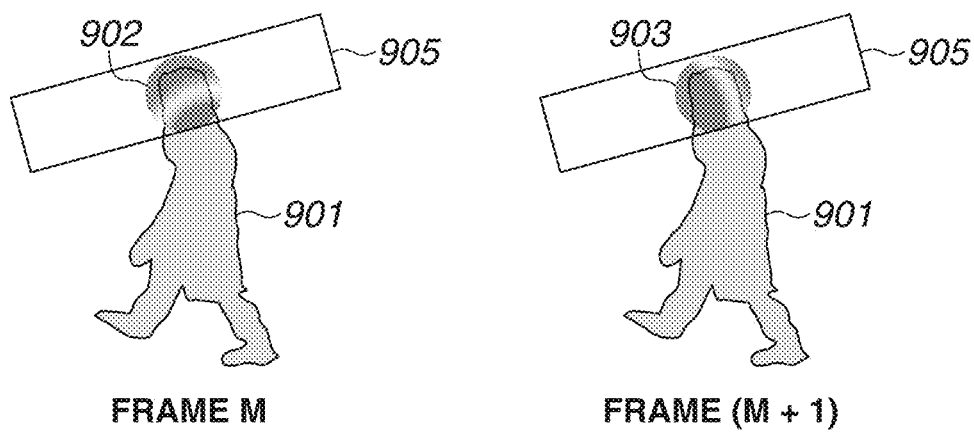
FRAME M    FRAME (M + 1)
↓ AVERAGE COMPONENTS 902 AND 903 WITHIN MEASUREMENT AREA 905
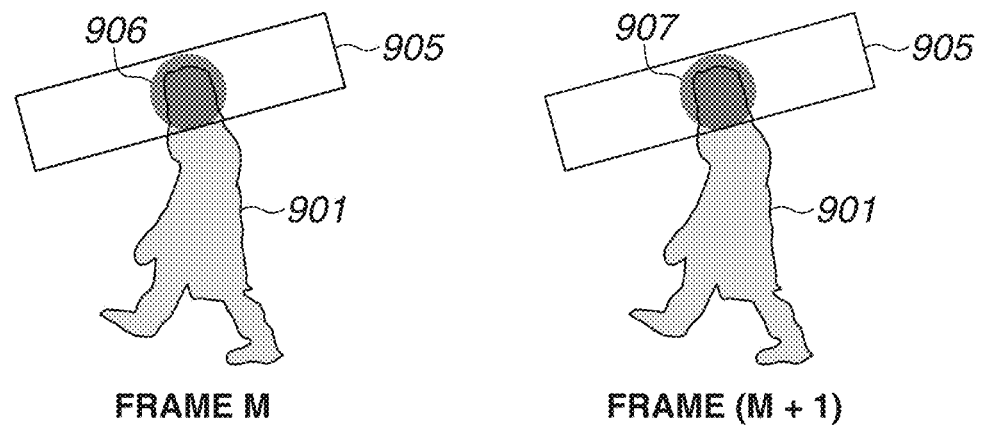
FRAME M    FRAME (M + 1)

PEOPLE FLOW ANALYSIS APPARATUS, PEOPLE FLOW ANALYSIS METHOD, AND STORAGE MEDIUM

BACKGROUND OF THE INVENTION

Field of the Invention

The present invention relates to a people flow analysis apparatus, a people flow analysis method, and a storage medium.

Description of the Related Art

In recent years, there proposes an apparatus that analyzes an amount and a direction of a people flow in an image-capturing area, namely, a people flow based on an image captured up by a camera. The analysis of a people flow enables a level of congestion on a target area and a temporal change such as an abrupt increase of the level of congestion to be tracked. Thus, this analysis is expected to prevent accidents or crimes caused by congestion in facilities, event sites, parks, and entertainment parks that attract a large crowd.

Japanese Patent Application Laid-Open No. 2009-110152 discusses a congestion estimation apparatus that divides an image into a plurality of patches and determines whether human figures move or stay within the respective patches. Further, Japanese Patent Application Laid-Open No. 2005-242646 discusses a people flow measurement apparatus that averages an optical flow of all pixels on an image within the image and in a temporal direction to obtain an estimation speed, and calculates a moving speed.

However, recent camera performance has improved, and thus a high-resolution image is easily acquired. Such a high-resolution image includes many pixels, and thus image size increases.

In the techniques discussed in Japanese Patent Application Laid-Open Nos. 2009-110152 and 2005-242646, a people flow is analyzed by using an entire image, and thus the analysis of a people flow on an image having large size is slow. For this reason, a phenomenon, such as an abrupt change in a people flow, which occurs in a short time cannot be obtained in real time.

Further, in a people flow analysis, in a case where a plurality of patterns of a people flow is seen within an image, local information regarding respective places and directions of people flows is desirably acquired. In this case, sufficient high analysis accuracy is necessary for clearly distinguishing the plurality of patterns of people flows.

In Japanese Patent Application Laid-Open No. 2005-242646, an optical flow of all pixels on an image is averaged within the image and in a temporal direction so that a moving speed is to be accurately calculated. However, this method can accurately obtain a general tendency of the people flow on the entire image, but cannot track a change in a local people flow within the image.

SUMMARY OF THE INVENTION

According to an aspect of the present disclosure, an image processing apparatus includes a measurement area setting unit configured to set a measurement area in an input image, a small image setting unit configured to set a small image in the input image based on the measurement area, a first estimation unit configured to estimate a flow distribution of a target in the small image, and a second estimation unit configured to estimate the number of targets to pass through the measurement area based on the flow distribution in the small image.

Further features of the present disclosure will become apparent from the following description of exemplary embodiments with reference to the attached drawings.

BRIEF DESCRIPTION OF THE DRAWINGS

FIG. 9D is a diagram illustrating one example of a method for extending a measurement area in the adjacent two frames to make the result of estimating the passing number stable.

DESCRIPTION OF THE EMBODIMENTS

An exemplary embodiment of the present disclosure will be described below with reference to the drawings.

Figure 1:
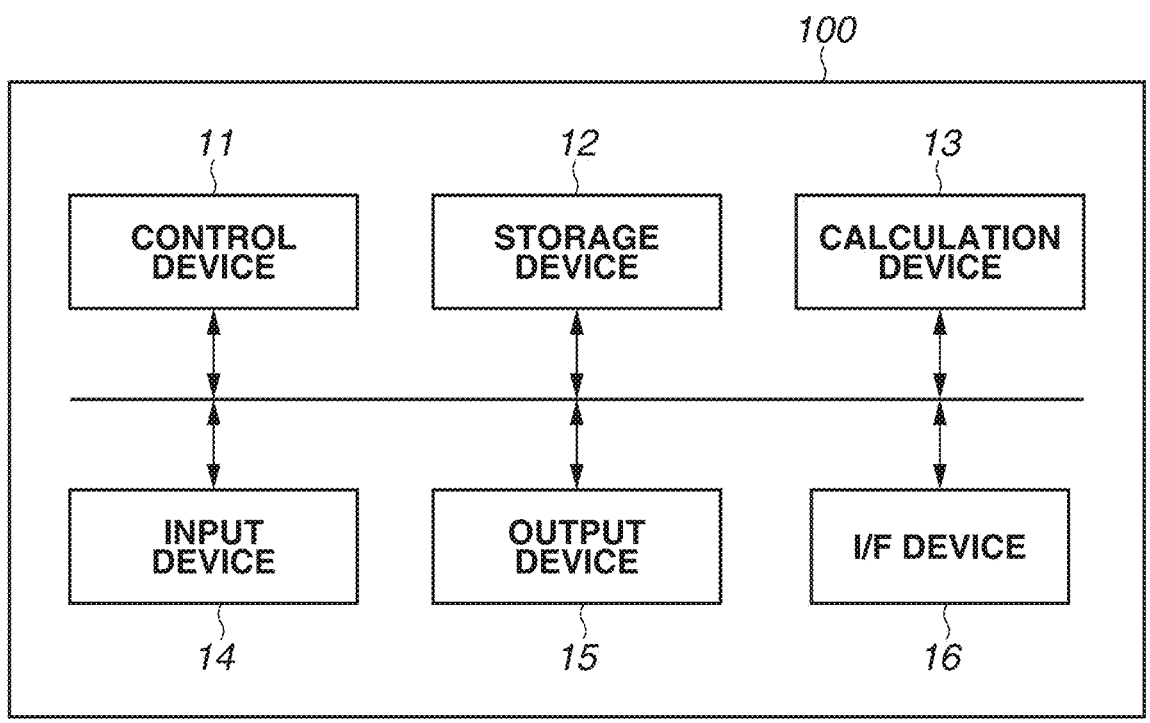
FIG. 1 is a diagram illustrating one example of a hardware configuration of an image processing apparatus.

FIG. 1 is a diagram illustrating one example of a hardware configuration of an image processing apparatus 100. The image processing apparatus 100 includes a control device 11, a storage device 12, a calculation device 13, an input device 14, an output device 15, and an interface (I/F) device 16 as the hardware configuration.

The control device 11 entirely controls the image processing apparatus 100.

The storage device 12 saves programs and data that are necessary for an operation of the control device 11.

The calculation device 13 executes necessary calculation processing based on control by the control device 11.

The input device 14, which is a human interface device, inputs an operation from a user into the image processing apparatus 100.

The output device 15, which is a display, presents a processing result of the image processing apparatus 100 to a user.

The I/F device 16 is a wired interface such as a universal serial bus, an Ethernet, or an optical cable, or a wireless interface such as Wi-Fi® or Bluetooth®. The I/F device 16 has a function for connecting a camera to input a captured image into the image processing apparatus 100, a function for transmitting a processing result acquired by the image processing apparatus 100 to an outside, and a function for inputting a program and data necessary for an operation of the image processing apparatus 100 into the image processing apparatus 100.

Execution of processing by the control device 11 based on the program stored in the storage device 12 achieves the functions of the image processing apparatus 100 illustrated in FIG. 2, described below, and processing in a flowchart illustrated in FIG. 3, described below.

Figure 2:
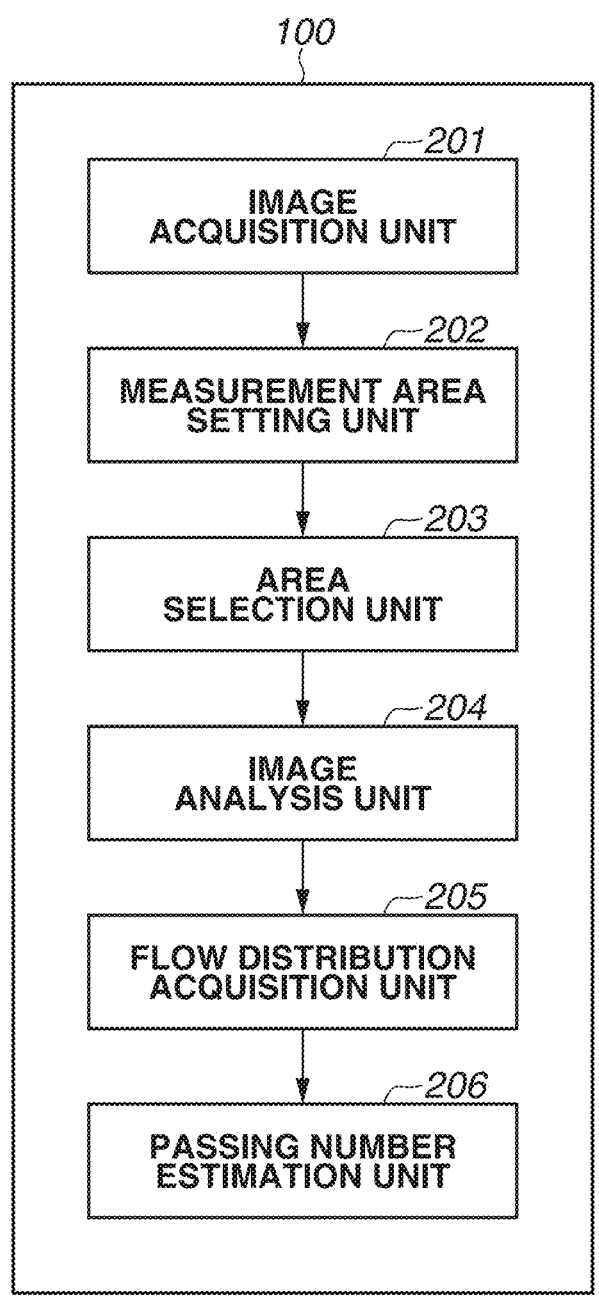
FIG. 2 is a diagram illustrating one example of a functional configuration of the image processing apparatus.
Figure 3:
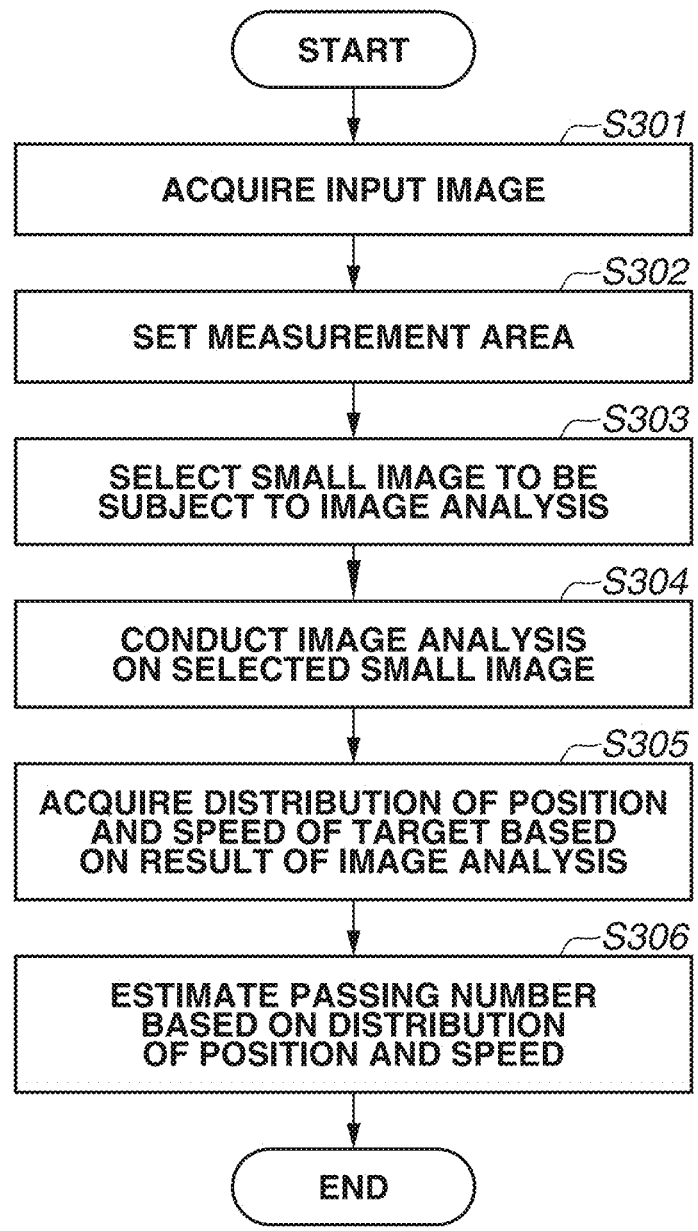
FIG. 3 is a flowchart illustrating one example of image processing.

FIG. 2 is a diagram illustrating one example of a functional configuration of the image processing apparatus 100. The image processing apparatus 100 includes an image acquisition unit 201, a measurement area setting unit 202, an area selection unit 203, an image analysis unit 204, a flow distribution acquisition unit 205, and a passing number estimation unit 206 as the functional configuration.

The image acquisition unit 201 acquires an input image necessary for people flow analysis.

The measurement area setting unit 202 sets, as a measurement area, an area where the people flow analysis is desired to be conducted on the input image acquired by the image acquisition unit 201.

The area selection unit 203 selects a small image to be analyzed by the image analysis unit 204, based on the measurement area set by the measurement area setting unit 202.

The image analysis unit 204 conducts image analysis of the small image selected by the area selection unit 203.

The flow distribution acquisition unit 205 acquires a flow distribution of a target for the people flow analysis based on an image analysis result acquired by the image analysis unit 204.

The passing number estimation unit 206 estimates a passing number in the measurement area set by the measurement area setting unit 202, based on the flow distribution acquired by the flow distribution acquisition unit 205.

An example of a flow of image processing to be executed by the image processing apparatus 100 will be described with reference to FIG. 3.

In step S301, the image acquisition unit 201 acquires an input image necessary for the people flow analysis. The image acquisition unit 201 can acquire an image from a solid-state imaging device such as a complementary metal-oxide semiconductor (CMOS) sensor or a charge-coupled device (CCD) sensor, or a camera mounted with such a solid-state image sensing device. Alternatively, the image acquisition unit 201 can acquire an image by reading out an image from the storage device 12 such as a hard disc or a solid state drive (SSD).

In step S302, the measurement area setting unit 202 sets a measurement area in the input image acquired by the image acquisition unit 201. The measurement area setting unit 202 can acquire, for example, a setting value predetermined based on a captured scene as the measurement area from the storage device. Further, the measurement area setting unit 202 can set the measurement area in an image displayed on the output device 15 based on a user operation using a human interface device or the like connected to the input device 14. A single measurement area or a plurality of measurement areas can be set.

The measurement area can be set based on any guide figure such as a liner figure or a rectangular figure. A single guide figure or a plurality of guide figures can be used. The measurement area setting unit 202 can extend the measurement area in a manner that a width is provided to the guide figure.

Figure 4:
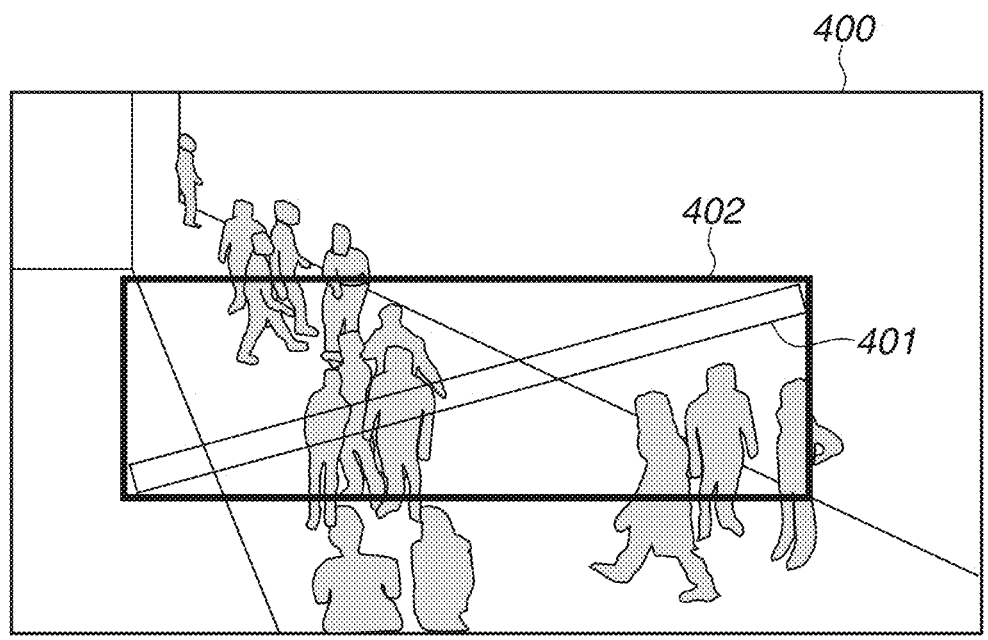
FIG. 4 is a diagram illustrating one example of a method for selecting a small image.

In step S303, the area selection unit 203 selects a small image from the input image acquired by the image acquisition unit 201, based on the measurement area set by the measurement area setting unit 202. FIG. 4 is a diagram illustrating one example of a method for selecting a small image. An image 400 is an input image, and a small image 402 including a measurement area 401 is selected. The small image 402 has a rectangular shape, but the shape of the small image is not limited to the rectangle, and thus the small image can have any shape including the measurement area.

Figure 5A:
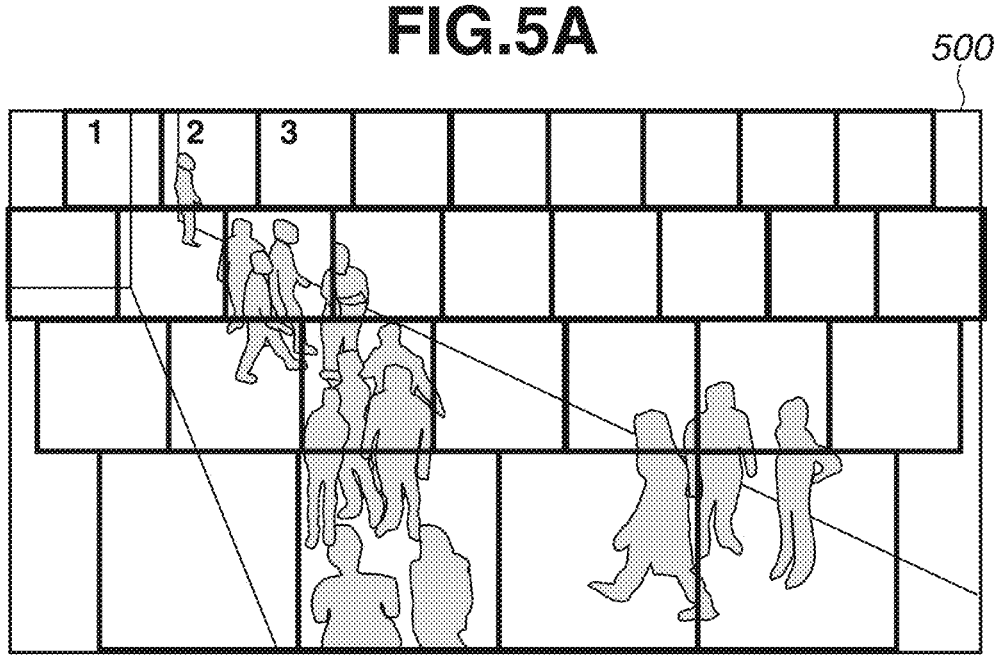
FIG. 5A is a diagram illustrating one example of division of an input image into small images.
Figure 5B:
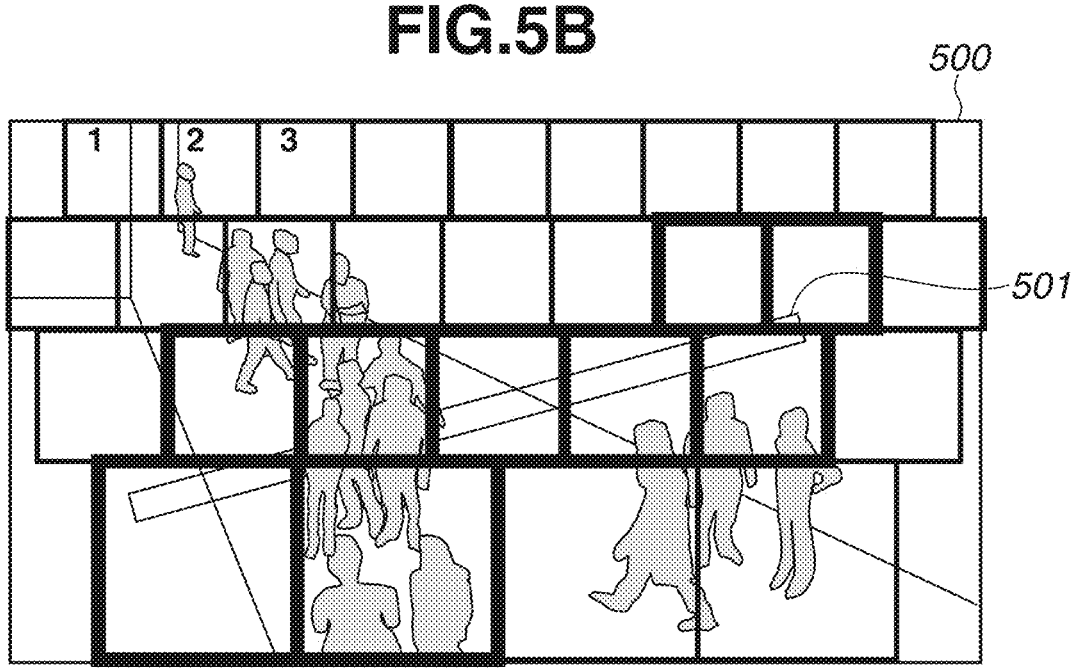
FIG. 5B is a diagram illustrating one example of selection of the small images including a measurement area.

The area selection unit 203 can divide the input image acquired by the image acquisition unit 201 into a plurality of small images and select a small image from the plurality of small images. For the division into the plurality of small images, various methods can be used. FIG. 5A illustrates one example of such division. In FIG. 5A, an image 500 is an input image, and rectangles represent small images acquired by dividing the input image 500 into the N-number of small images. The area selection unit 203 divides the input image into small images, and then selects a plurality of small images. At this time, the plurality of small images includes a measurement area. FIG. 5B illustrates one example of a method for selecting such small images. Rectangles indicated by thick frames in FIG. 5B are small images selected to include a measurement area 501.

Figure 6:
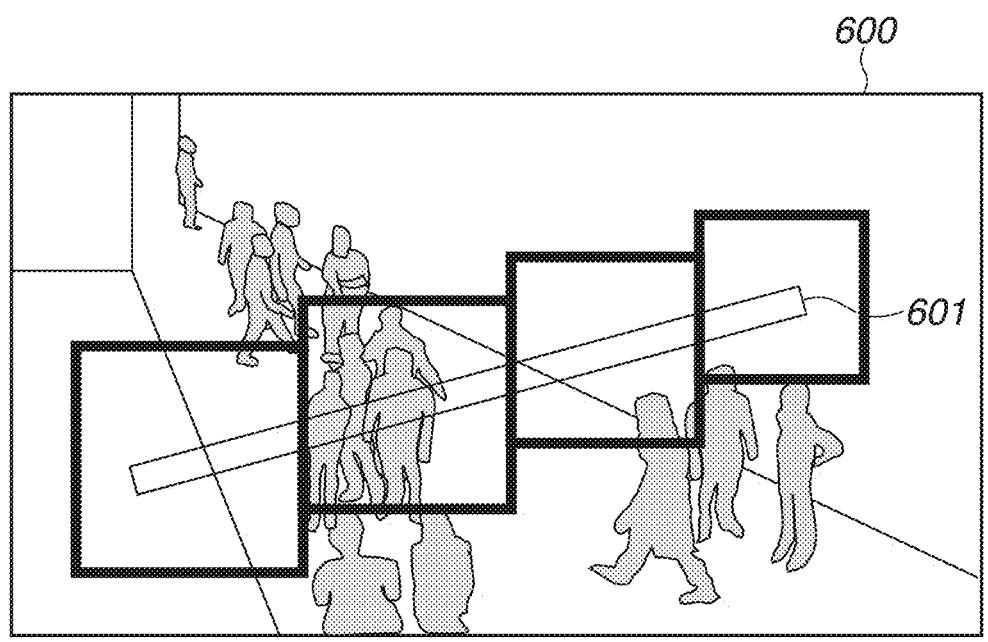
FIG. 6 is a diagram illustrating one example of division into small images and selection of the small images based on the measurement area.

The area selection unit 203 can divide the input image into small images to select small images based on the measurement area set on the input image by the measurement area setting unit 202. FIG. 6 illustrates one example of such division. In FIG. 6, an input image 600 is divided so that small images indicated by thick frames are aligned based on a measurement area 601 set on the input image 600.

In FIGS. 5A, 5B, and 6, the small images have rectangular shapes, but the shapes of the small images are not limited to the rectangular shapes. Thus, the small images can have any shapes to include the measurement area.

The area selection unit 203 can automatically select small images. Alternatively, a user can operate the human interface device connected to the input device 14 to cause the area selection unit 203 to set small images on an image displayed on the output device 15.

On an input image captured by a camera or the like, a size of a human figure occasionally varies depending on positions in the input image. In this case, it is desirable that sizes of small images are determined so that respective ratios between the sizes of the small images and the sizes of the human figures are approximately constant. FIGS. 5A, 5B, and 6 illustrate examples of such division.

The area selection unit 203 can use, for example, prepared setting values as the sizes of the small images. Alternatively, the area selection unit 203 can automatically determine the sizes of the small images based on an installation position of the camera, geometric parameters calculated from information such as a viewing angle, or a size of a human figure in the input image acquired from analysis of the input image. The area selection unit 203 can set the sizes of the small images based on a user operation on an image displayed on the output device 15, using the human interface device connected to the input device 14.

Figure 7A:
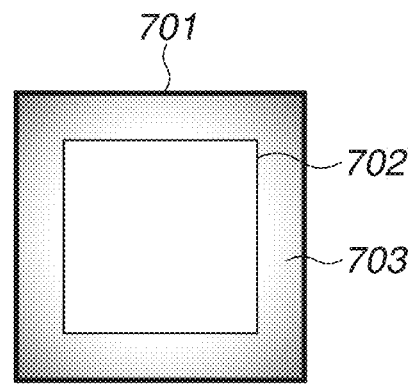
FIG. 7A is a diagram illustrating one example in a case where a central area and a margin area are set on a small image.

In a case where an image of a human figure to be subject to the people flow analysis is cut out from a portion near a boundary of the small image selected in step S303, accuracy in the image analysis in step S304 at a subsequent stage is deteriorated. In order to avoid this situation, the area selection unit 203 defines a central area inside the small image and a margin area, which is surrounded by a boundary line of the small image and a boundary line of the central area. FIG. 7A illustrates one example of this state. In FIG. 7A, a new central area 702 is defined inside a small image 701, and a new margin area 703, which is surrounded by a boundary line of the small image 701 and a boundary line of the central area 702, is defined.

Figure 7B:
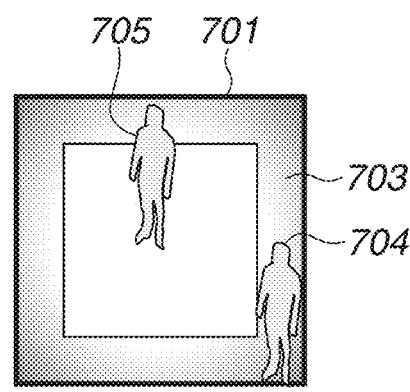
FIG. 7B is a diagram illustrating one example in a case where a margin area is set.

A size of the margin area is desirably set so that a portion necessary for detection of a human figure to be subject to the people flow analysis is included in the margin area of the small image. FIG. 7B illustrates one example of this state. In FIG. 7B, the margin area 703 of the small image 701 is set to include a portion necessary for detection of human FIGS. 704 and 705 to be subject to the people flow analysis. FIG. 7B illustrates the case where the size is set so that the margin area includes heads and shoulders of the human figures as one example. However, besides this case, the size can be set so that the margin area includes only heads or whole bodies of human figures.

In the examples of FIGS. 7A and 7B, the central area 702 has the rectangular shape, but the shape of the central area is not limited to the rectangular shape, and thus the central area can have any shape as long as it is included in the small image 701.

Figure 7C:
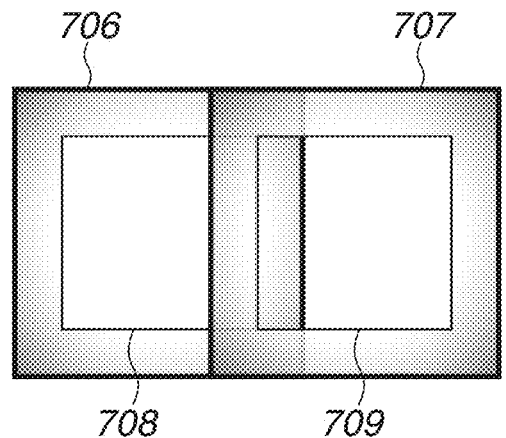
FIG. 7C is a diagram illustrating one example in a case where an input image is divided into small images.
Figure 7D:
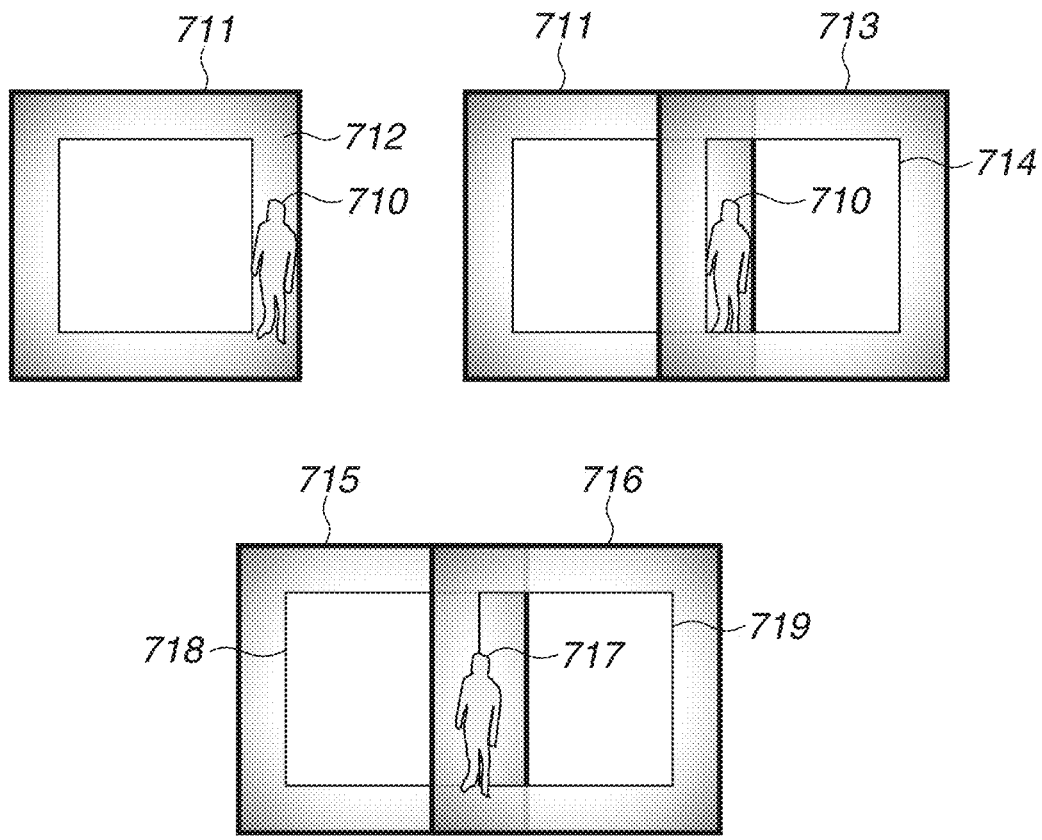
FIG. 7D is a diagram illustrating examples in a case where a detection target exists on the margin area, respectively.

It is desirable that the area selection unit 203 divides an input image into a plurality of small images to select small images with adjacent areas of the respective small images overlap each other. FIG. 7C illustrates one example of such division. In FIG. 7C, in adjacent two small images 706 and 707, the area selection unit 203 makes a central area 708 of a small image 706 and a central area 709 of a small image 707 adjacent to each other with no gap being provided between the central areas 708 and 709. The area selection unit 203 then carries out division so that the adjacent areas of the small images 706 and 707 overlap each other. In such a state, for example, as illustrated in FIG. 7D, in a case where a human FIG. 710 to be desirably detected is in a margin area 712 of a small image 711, the human FIG. 710 can be detected on a central area 714 of a small image 713 adjacent to the small image 711. In an example where detection of a human FIG. 717 across both small images 715 and 716, the image processing apparatus 100 detects a left half portion of the human FIG. 717 on a central area 718 of the small image 715 and a right half portion of the human FIG. 717 on a central area 719 of the small image 716. Then, the image processing apparatus 100 integrates the results.

In any cases illustrated in FIG. 7D, detection of a human figure on the central area in the small image is necessary. For this reason, when the input image is divided into small images so that adjacent areas of the small images overlap each other, as illustrated in FIGS. 7C and 7D, the central areas of the small images are desirably adjacent to each other without a gap.

Further, the area selection unit 203 can determine a dividing method that covers a measurement area of a bare minimum area while maintaining margin areas of the small images based on minimizing calculation.

Figure 7E:
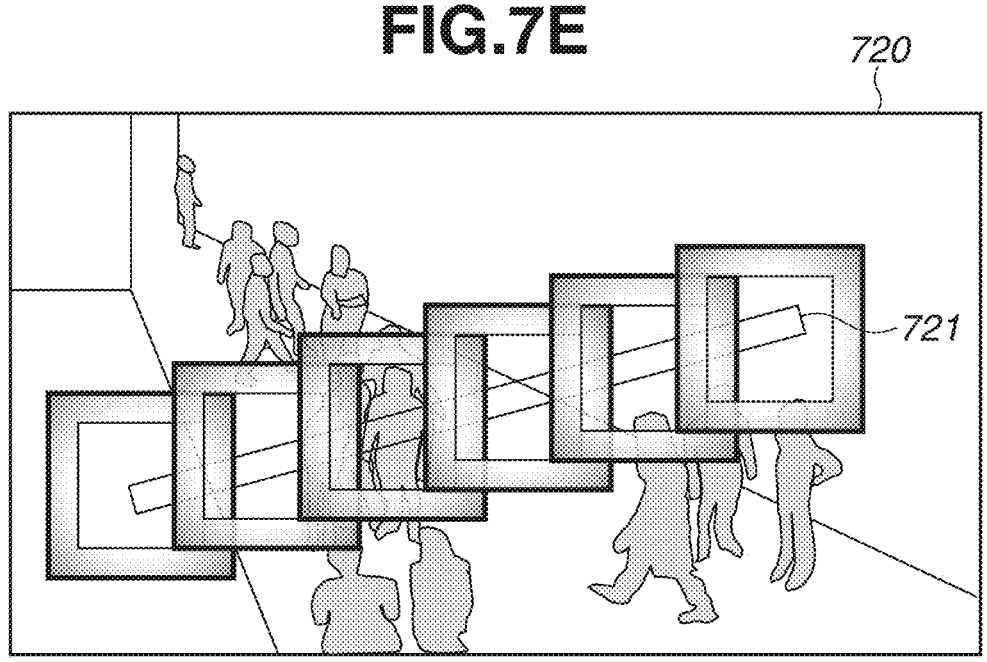
FIG. 7E is a diagram illustrating one example in a case where an input image is divided into small images along a measurement area.

Division illustrated in FIG. 7E is one example of the method for dividing into small images, in which margin areas are defined, along a measurement area 721 set on an input image 720.

In step S304, the image analysis unit 204 conducts the image analysis of small images selected by the area selection unit 203, and outputs flow distributions of human figures to be subject to the people flow analysis in the small images.

The flow distribution represents a flow rate detected on each pixel position in the small image in a frame where an input image is acquired. The flow rate is a quantity of targets flowing on a certain image position per unit time. The image analysis unit 204 integrates the flow distribution by a number of frames within the measurement area in a temporal direction. As a result, the image analysis unit 204 can calculate a passing number of human figures, namely, a people flow in the measurement area.

The flow distribution to be output by the image analysis unit 204 has various forms. For example, a single distribution of information regarding both a position and a speed can be output, or a plurality of distributions such as a position distribution (or density distribution) and a speed distribution can be output. In a case where the plurality of distributions such as the position distribution (or density distribution) and the speed distribution is output, the image analysis unit 204 obtains, for example, the product of the position (or density) distribution and the speed distribution to be capable of conducting conversion into the flow distributions.

Various methods can be used in the image analysis. For example, the image analysis unit 204 uses two images in two frames adjacent to each other in a captured moving image as an input image. In this case, the image analysis unit 204 conducts an analysis using deep learning through a neural network to output the flow distributions. The image analysis unit 204 can analyze a feature amount of a human figure to be detected as an input.

The image analysis method is not limited to the above-described method, and thus, for example, the image analysis unit 204 can use probabilistic modeling represented by Bayesian statistics, a kernel method, a decision tree, a random forest, or gradient boosting.

The image analysis unit 204 can use a single method as the image analysis method, or can combine a plurality of methods as an ensemble method.

In step S305, the flow distribution acquisition unit 205 acquires a flow distribution of a human figure to be subject to the people flow analysis in a small image to be analyzed, based on a result of the image analysis conducted by the image analysis unit 204. At this time, the flow distribution acquisition unit 205 acquires a distribution, which relates to portions overlapping the measurement area in the flow distributions, based on the measurement area set by the measurement area setting unit 202.

Figure 8A:
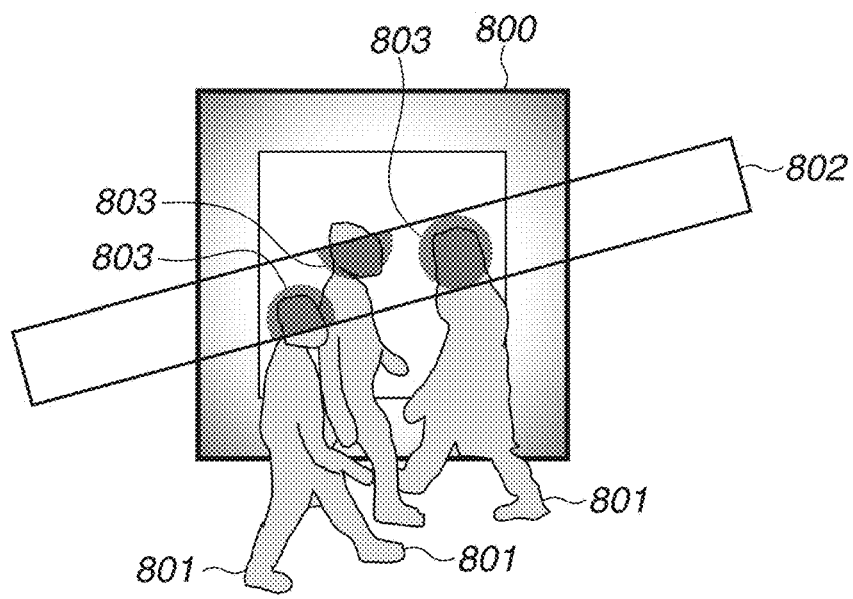
FIG. 8A is a diagram illustrating one example of a state where a flow distribution is acquired.

FIG. 8A illustrates one example of a state where the flow distribution is acquired. Inside a measurement area 802 set in a small image 800, a flow related to a head position of a human FIG. 801 in a frame of the small image is detected, and is acquired as flow distributions 803. In FIG. 8A, dark black areas indicated as the flow distributions 803 inside the small image 800 indicate that a human figure who moves in the area exists, namely, a people flow exits. On the other hand, areas other than the dark black areas indicated in the flow distributions 803 indicate that no people flow exits. The flow distribution does not always desirably cover a whole human figure to be subject to the people flow analysis, and thus as illustrated in FIG. 8A, the flow distribution may cover only a representative position such as the head portion of the human figure.

Figure 8B:
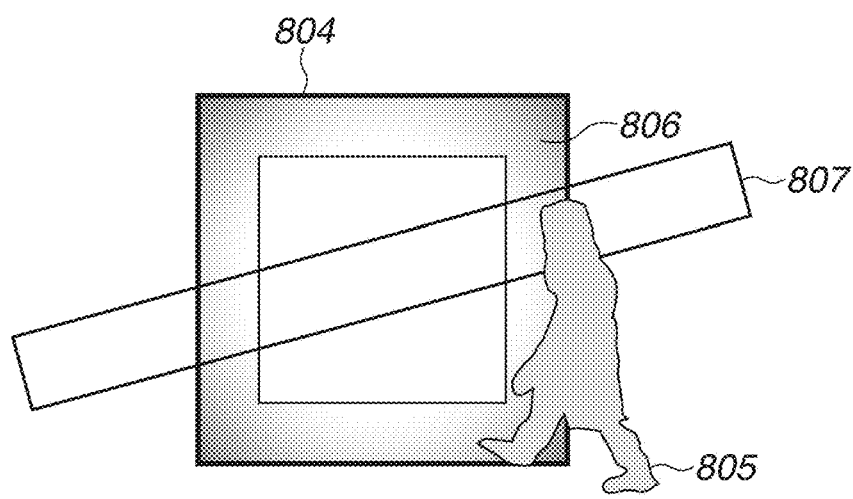
FIG. 8B is a diagram illustrating one example in a case where a human figure is in a margin area of a small image.
Figure 8C:
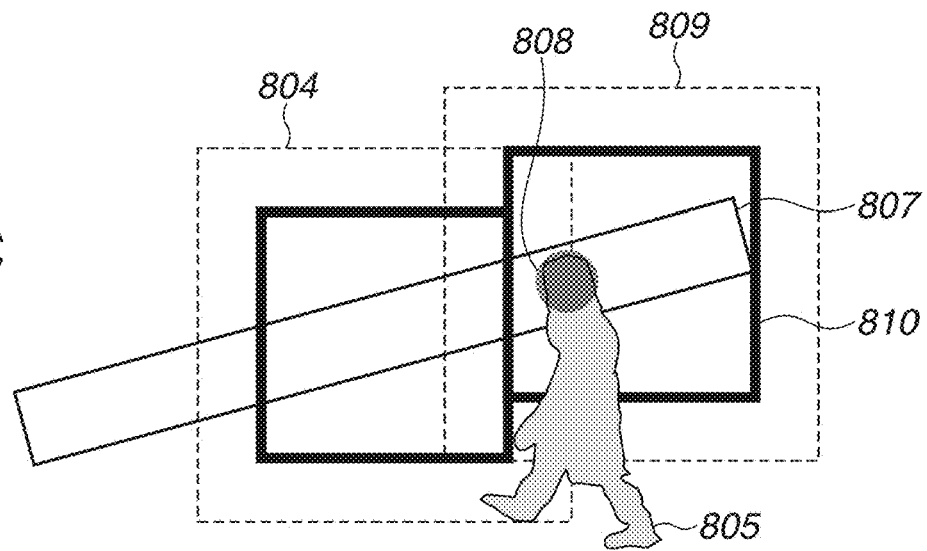
FIG. 8C is a diagram illustrating one example in a case where a flow distribution is acquired from an area which does not overlap an adjacent small image.

FIG. 8B illustrates one example in a case where a human FIG. 805 to be subject to the people flow analysis is in a margin area 806 of a small image 804. In this case, if a people flow of the human FIG. 805 in a measurement area 807 is tried to be analyzed by using the small image 804, image information about the human FIG. 805 cannot be sufficiently used for the image analysis in the image analysis unit 204. This is because the small image 804 includes only a part of the human FIG. 805. Thus, analysis accuracy is deteriorated. Therefore, the flow distribution acquisition unit 205 acquires a flow distribution from each area which does not overlap each adjacent small image, based on the result of the image analysis conducted on the divided small images by the image analysis unit 204. FIG. 8C illustrates one example of such a result. The flow distribution acquisition unit 205 does not use a result in the margin area, which overlaps the adjacent small image, but uses a result in the central area, which does not overlap the adjacent small image. As a result, deterioration of recognition accuracy is prevented. The flow distribution acquisition unit 205 can acquire a flow distribution 808 acquired as the result of the people flow analysis conducted for the human FIG. 805 in the measurement area 807 from a central area 810 of a small image 809. The central area 810 is adjacent to the small image 804 and includes a head portion of the human FIG. 805.

In step S306, the passing number estimation unit 206 estimates a passing number in the measurement area set by the measurement area setting unit 202, based on the flow distribution of the human figure to be subject to the people flow analysis acquired by the flow distribution acquisition unit 205.

The passing number in the measurement area can be calculated as follows.

First, the passing number estimation unit 206 sets a measurement direction of a people flow to be a target in the measurement area. The passing number estimation unit 206 can acquire, from the storage device, a setting value predetermined based on a captured scene, as a people flow direction. Further, the passing number estimation unit 206 can use a method based on a shape of the measurement area, such as, a method using a normal direction of the measurement area. Furthermore, the passing number estimation unit 206 can set a measurement direction based on an image displayed on the output device 15. At this time, a user operates the human interface device connected to the input device 14 to cause the passing number estimation unit 206 to make the setting. The passing number estimation unit 206 may set a single measurement direction or a plurality of measurement directions.

Thereafter, the passing number estimation unit 206 calculates a component along the measurement direction in the flow distribution acquired by the flow distribution acquisition unit 205. For example, the passing number estimation unit 206 calculates an inner product of the flow distribution and a unit vector having the component in the measurement direction.

Lastly, the passing number estimation unit 206 integrates the components, which are along the measurement direction in the flow distribution, in a temporal direction by a number of frames of the input image acquired by the image acquisition unit 201. Then, the passing number estimation unit 206 calculates the passing number in the measurement direction.

Figure 9A:
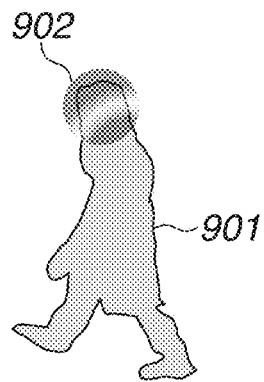
FIG. 9A is a diagram illustrating one example of a local error included in an analysis result of a flow distribution.

Herein, in the image analysis to be conducted by the image analysis unit 204, non-uniformity and uncertainty due to an analysis method cannot be avoided, and a local error is included in the components along the measurement direction of the flow distribution. FIG. 9A conceptually illustrates a case where a component 902 of a head portion of a moving human FIG. 901 along the measurement direction of the flow distribution is approximately 0 around a center portion due to an error of the image analysis in the image analysis unit 204, as grayscale of the image. Herein, a flow value is large in a dark portion of the image and is small in a light portion.

Figure 9B:
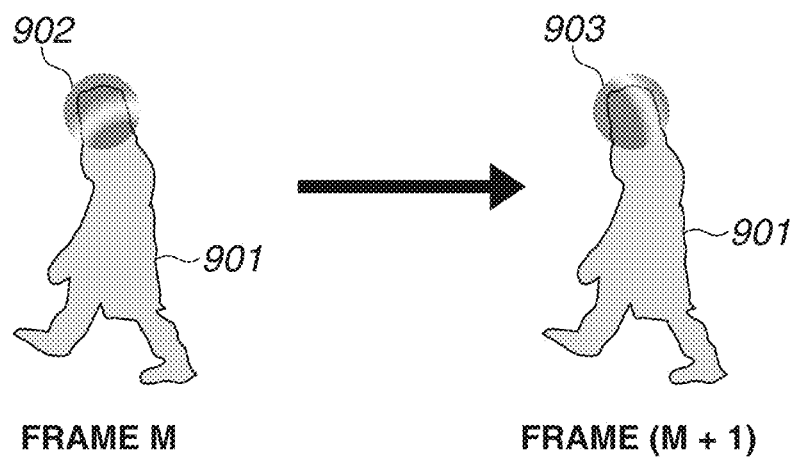
FIG. 9B is a diagram illustrating one example of a local error included in an analysis result of the flow distribution in adjacent two frames.
Figure 9C:
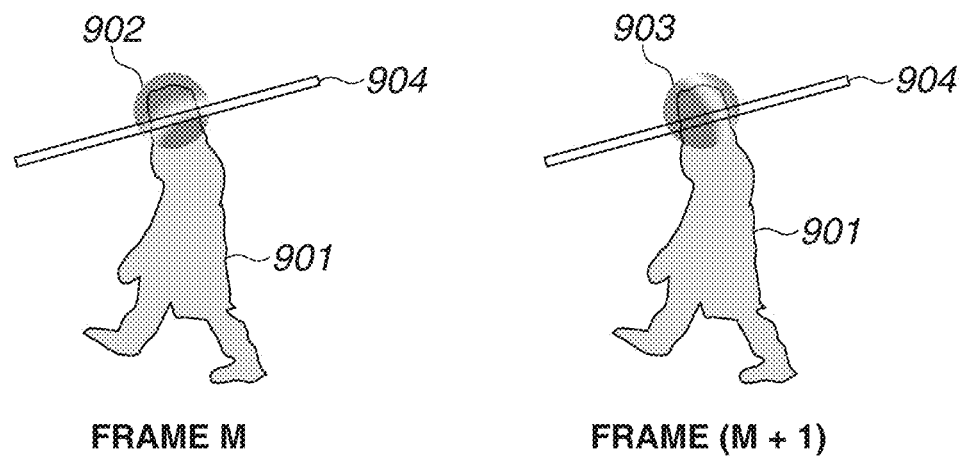
FIG. 9C is a diagram illustrating one example in a case where a result of estimating a passing number extremely changes in a short time in the adjacent two frames.

The local error due to the image analysis in the image analysis unit 204 does not always have an identical pattern. In a case where the analysis is sequentially conducted for each frame of frame images in a moving image as the input image, for example, as illustrated in FIG. 9B, the pattern might be different in adjacent two frames M and (M+1) where the human FIG. 901 makes an approximately identical motion. The error of the component along the measurement direction of the flow distribution is a component 902 in the frame M, whereas the error is a component 903 in the frame (M+1). In this case, for example, in a case where a measurement area 904 is narrow as illustrated in FIG. 9C, the passing number is approximately 0 in the frame M, whereas the passing number is not 0 in the frame (M+1). Thus, the estimation result of the passing number extremely changes in a short time, and thus becomes unstable.

Therefore, in order to reduce an influence of the local error, it is desirable that the measurement area is extended and components along the measurement direction of the flow distribution are integrated in an area including the extended range. FIG. 9D illustrates one example of such a method. In FIG. 9D, in a measurement area 905 that is extended, the passing number estimation unit 206 integrates the components 902 and 903 along the measurement direction of the flow distribution in the area including the extended range. In such a manner, the components 902 and 903 along the measurement direction of the flow distribution are averaged within the measurement area 905, and the estimation result of the passing number is prevented from changing in a short time. Thus, the estimation result is expected to be stable.

When the components 902 and 903 along the measurement direction of the flow distribution are displayed on the output device 15, the passing number estimation unit 206 can display, for example, components 906 and 907. The components 906 and 907, which have been averaged within the measurement area 905 for easy viewing, are displayed along the measurement direction of the flow direction as illustrated in FIG. 9D.

In a method for extending the measurement area, for example, extension of the guide figure used by the measurement area setting unit 202 can be utilized. For example, the passing number estimation unit 206 extends a width of the area in a normal direction vertical to a long side of the measurement area in a case where the measurement area is a long and narrow figure such as a linear or bar-shaped figure.

The image processing apparatus 100 can save, in addition to an estimation result of a passing number, a measurement area, the position of a small image, a margin area, a central area, and a flow distribution that are grounds for the estimation result, in the storage device 12, or can display them on the output device 15. The image processing apparatus 100 can transmit the various results saved in the storage device 12 to an outside via the 1/F device 16. Further, the image processing apparatus 100 can set contents desired to be saved in the storage device 12, and items desired to be displayed on the output device 15. At this time, a user can operate the human interface device, which is connected to the input device 14, to cause the image processing apparatus 100 to make the setting.

A human figure is described as a target to be subject to the people flow analysis, but the target is not limited to a human figure. For example, the target can include vehicles such as a bicycle, a motorcycle, an automobile, and a track, and animals such as livestock.

According to the above-described exemplary embodiment, high-speed, high-precision people flow estimation is enabled even for a high-resolution image having many pixels.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-070654, filed Apr. 2, 2019, which is hereby incorporated by reference herein in its entirety.

What is claimed is:

1. An image processing apparatus comprising:
a processor; and
a memory storing executable instructions which, when executed by the processor, cause the image processing apparatus to perform operations including:
setting a measurement area in an input image;
setting a small image in the input image based on the measurement area;
estimating a flow distribution of a target in the small image; and
estimating the number of targets to pass through the measurement area based on the flow distribution in the small image,
wherein the input image is divided into a plurality of small images with adjacent small images overlapping each other;
a small image which is included in the measurement area is selected from the plurality of small images; and
a number of targets to pass through the measurement area is estimated based on a flow distribution, which has been acquired from an area that does not overlap an adjacent small image as to the respective divided small images in the flow distributions.

2. The image processing apparatus according to claim 1, wherein the measurement area is set based on a reference figure.

3. The image processing apparatus according to claim 1, wherein the input image is divided into the plurality of small images based on the measurement area.

4. The image processing apparatus according to claim 1, wherein the input image is divided into the plurality of small images based on a size of the target.

5. The image processing apparatus according to claim 1, wherein the small image includes a margin area near a boundary and a central area excluding the margin area, and the input image is divided into the plurality of small images to cause central areas of the adjacent small images to come into contact with each other.

6. The image processing apparatus according to claim 5, wherein a size of the margin area is set based on a size of the target.

7. The image processing apparatus according to claim 1, wherein the flow distribution in an area which overlaps the measurement area in the small image is estimated.

8. The image processing apparatus according to claim 1, wherein executing the executable instructions causes the information processing apparatus to perform further operations including:
acquiring the input image, wherein the measurement area is set in the acquired input image.

9. The image processing apparatus according to claim 8, wherein the input image is acquired from a solid-state image sensing device.

10. The image processing apparatus according to claim 8, wherein the input image is acquired from a storage device.

11. The image processing apparatus according to claim 1, wherein one or a plurality of measurement areas are set on the input image.

12. The image processing apparatus according to claim 1, wherein executing the executable instructions causes the information processing apparatus to perform further operations including outputting the number of targets.

13. The image processing apparatus according to claim 12, wherein the measurement area is output.

14. The image processing apparatus according to claim 12, wherein a position of the small image is output.

15. The image processing apparatus according to claim 12, wherein the flow distribution is output.

16. An image processing method comprising:
setting a measurement area in an input image;
setting a small image in the input image based on the measurement area;
estimating a flow distribution of a target in the small image; and
estimating the number of targets to pass through the measurement area based on the flow distribution in the small image, wherein the input image is divided into a plurality of small images with adjacent small images overlapping each other;

a small image which is included in the measurement area is selected from the plurality of small images; and a number of targets to pass through the measurement area is estimated based on a flow distribution, which has been acquired from an area that does not overlap an adjacent small image as to the respective divided small images in the flow distributions.

17. A non-transitory computer-readable storage medium storing a program for causing a computer to:

set a measurement area in an input image;

set a small image in the input image based on the measurement area;

estimate a flow distribution of a target in the small image; and estimate the number of targets to pass through the measurement area based on the flow distribution in the small image, wherein the input image is divided into a plurality of small images with adjacent small images overlapping each other;

a small image which is included in the measurement area is selected from the plurality of small images; and a number of targets to pass through the measurement area is estimated based on a flow distribution, which has been acquired from an area that does not overlap an adjacent small image as to the respective divided small images in the flow distributions.

* * * * *